US010546216B1

(12) United States Patent
Shachar et al.

(10) Patent No.: US 10,546,216 B1
(45) Date of Patent: Jan. 28, 2020

(54) RECURRENT PATTERN IMAGE CLASSIFICATION AND REGISTRATION

(71) Applicant: SEETREE SYSTEMS LTD., Tel Aviv (IL)

(72) Inventors: Ori Shachar, Nes Harim (IL); Michael Yushchuk, Mariupol (UA); Guy Salton-Morgenstern, Mevaseret-Zion (IL)

(73) Assignee: SEETREE SYSTEMS LTD., Tel Aviv (IL)

( * ) Notice: Subject to any disclaimer, the term of this patent is extended or adjusted under 35 U.S.C. 154(b) by 0 days.

(21) Appl. No.: 16/381,347

(22) Filed: Apr. 11, 2019

(51) Int. Cl.
*G06K 9/62* (2006.01)
*G06N 3/08* (2006.01)
*G06K 9/00* (2006.01)

(52) U.S. Cl.
CPC ....... *G06K 9/6256* (2013.01); *G06K 9/00657* (2013.01); *G06K 9/628* (2013.01); *G06N 3/08* (2013.01)

(58) Field of Classification Search
CPC ....... G06K 9/00657; G06K 9/628; G06N 3/08
See application file for complete search history.

(56) References Cited

U.S. PATENT DOCUMENTS

| 7,106,891 B2 | 9/2006 | Wyman et al. |
| 8,655,070 B1 | 2/2014 | Yang et al. |
| 2011/0170803 A1* | 7/2011 | Yokoi ............... G06T 3/4007 382/300 |
| 2012/0274896 A1 | 11/2012 | Vermeer et al. |
| 2015/0220810 A1* | 8/2015 | Mase ................. G06K 9/6202 382/195 |
| 2017/0076438 A1 | 3/2017 | Kottenstette et al. |

(Continued)

FOREIGN PATENT DOCUMENTS

CN     101110103 A     1/2008

OTHER PUBLICATIONS

Mohammed Imran et al: "An Improved Naive Bayes Classification to Enhance Image Registration", International Journal of Computer Trends and Technology (IJCTT), vol. 6, No. 3, Dec 2013, pp. 158-162.

(Continued)

*Primary Examiner* — Edward Park
(74) *Attorney, Agent, or Firm* — The Roy Gross Law Firm, LLC; Roy Gross

(57) ABSTRACT

A method comprising: receiving a source image and a target image, each depicting a dense recurring pattern comprising an array of objects arranged in close proximity to one another; applying a trained machine learning classifier to obtain a classification of each pixel in said source image and said target image into one of at least two classes; determining a pixel-level transformation between said classified source and target images, based, at least in part, on a set of transformation parameters; training a neural network to optimize said set of transformation parameters, based, at least in part, on minimizing a loss function which calculates a weighted sum of per-pixel matches between said classified source and target images; and applying said optimized set of transformation parameters to said target image. to align said target image with said source image.

20 Claims, 12 Drawing Sheets

(56) References Cited

U.S. PATENT DOCUMENTS

2018/0241929 A1* 8/2018 Bouzaraa ............. H04N 5/2355
2018/0330194 A1* 11/2018 Peng ................... G06K 9/6256

OTHER PUBLICATIONS

Soumyabrata Dev et al: "Machine Learning Techniques and Applications for Ground-based Image Analysis", arXiv:1606.02811, 2016, pp. 1-12.

Jayme Garcia Amal Barbedo et al: "A Review on the Automatic Segmentation and Classification of Agricultural Areas in Remotely Sensed Images", Embrapa Document Series, 156, Oct. 2018, pp. 1-32.

Max Jaderberg et al: "Spatial Transformer Networks", NIPS'15 Proceedings of the 28th International Conference on Neural Information Processing Systems, vol. 2, 2015, pp. 2017-2025.

Arland N. Khobragade: "Soft Classification Approaches for Identification of Agricultural Crops: Problems & Prospects using Indian Remote Sensing Data", Remote Sensing Agriculture Workshop—SARI, Resources Scientist Maharashtra Remote Sensing Applications Centre, Nagpur, Maharashtra State, India, Apr. 3, 2017.

Subhajit Sengupta: "Identification and Determination of the No. Of Green Citrus Fruit under Different Ambient Light conditions", Biosystems Engineering, vol. 117, Jan. 2014, pp. 51-61.

\* cited by examiner

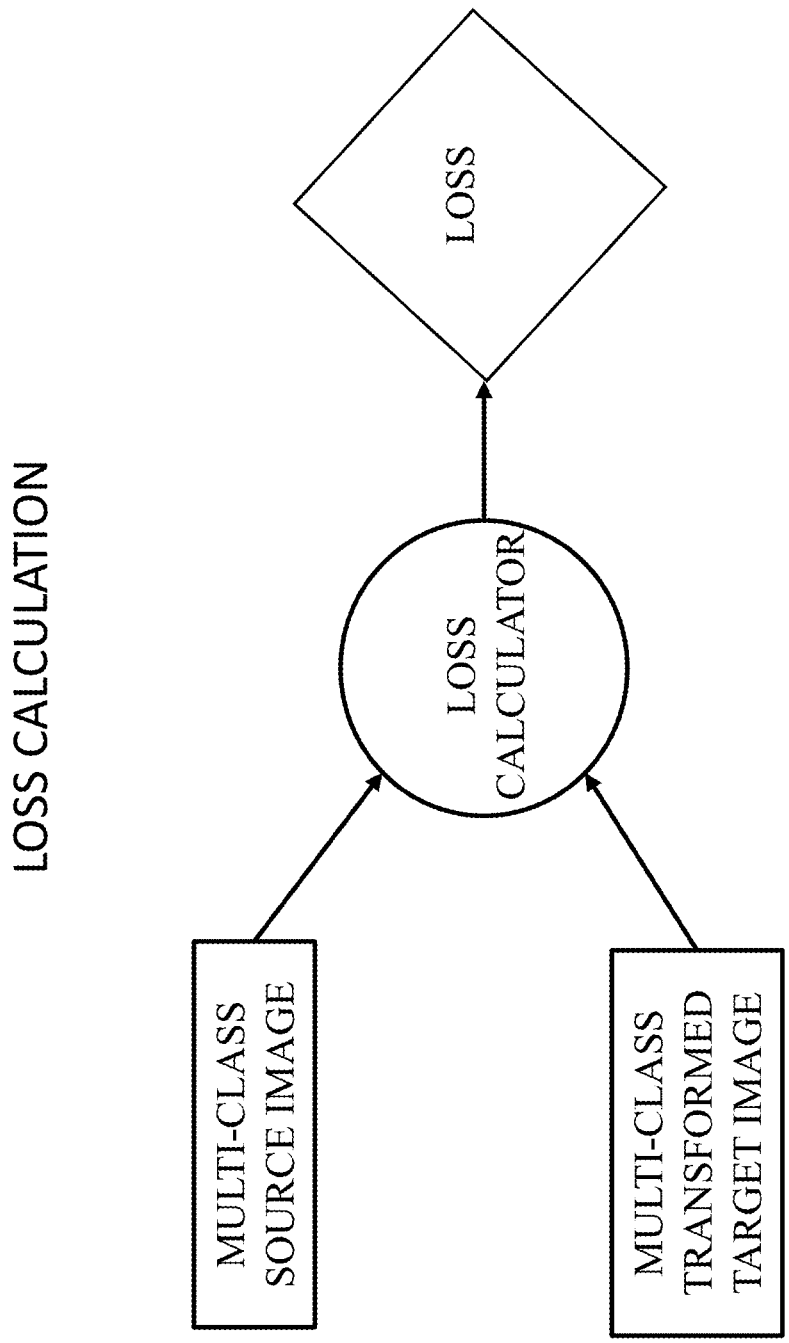

RECURRENT PATTERN IMAGE CLASSIFICATION AND REGISTRATION

FIELD OF THE INVENTION

The invention relates to the field of image processing and/or deep learning.

BACKGROUND

Image registration (also referred to as "alignment") may be an important field of research in a computer vision domain. In recent years, there has been a rapid development of image processing technologies, including image registration and/or object recognition technologies, e.g., due to advancements in machine learning. One advancement in machine learning may include implementing neural networks, e.g., deep neural networks, to solve object recognition and/or image registration problems. It may be desirable to automatically classify and/or align images depicting an agricultural crop and/or trees, for example, to enable effective monitoring of development, diseases, and crop yield.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: receiving a source image and a target image, each depicting a dense recurring pattern comprising an array of objects arranged in close proximity to one another; applying a trained machine learning classifier to obtain a classification of each pixel in said source image and said target image into one of at least two classes; determining a pixel-level transformation between said classified source and target images, based, at least in part, on a set of transformation parameters; training a neural network to optimize said set of transformation parameters, based, at least in part, on minimizing a loss function which calculates a weighted sum of per-pixel matches between said classified source and target images; and applying said optimized set of transformation parameters to said target image. to align said target image with said source image.

There is also provided, in an embodiment, a system comprising at least one hardware processor; and a non-transitory computer-readable storage medium having stored thereon program instructions, the program instructions executable by the at least one hardware processor to: receive a source image and a target image, each depicting a dense recurring pattern comprising an array of objects arranged in close proximity to one another, apply a trained machine learning classifier to obtain a classification of each pixel in said source image and said target image into one of at least two classes, determine a pixel-level transformation between said classified source and target images, based, at least in part, on a set of transformation parameters, train a neural network to optimize said set of transformation parameters, based, at least in part, on minimizing a loss function which calculates a weighted sum of per-pixel matches between said classified source and target images, and apply said optimized set of transformation parameters to said target image. to align said target image with said source image.

There is further provided, in an embodiment, a computer program product comprising a non-transitory computer-readable storage medium having program instructions embodied therewith, the program instructions executable by at least one hardware processor to: receive a source image and a target image, each depicting a dense recurring pattern comprising an array of objects arranged in close proximity to one another; apply a trained machine learning classifier to obtain a classification of each pixel in said source image and said target image into one of at least two classes; determine a pixel-level transformation between said classified source and target images, based, at least in part, on a set of transformation parameters; train a neural network to optimize said set of transformation parameters, based, at least in part, on minimizing a loss function which calculates a weighted sum of per-pixel matches between said classified source and target images; and apply said optimized set of transformation parameters to said target image. to align said target image with said source image.

In some embodiments, said minimizing is based, at least in part, on a gradient descent algorithm.

In some embodiments, at least some of said objects are in contact engagement with one another.

In some embodiments, said objects are selected from the group consisting of trees, plants, shrubs, and crops, and wherein said array comprises a planting layout of said objects in one of an orchard, a grove, a field, and a wood.

In some embodiments, said source and target images are selected from the group consisting of: images taken concurrently, images taken consecutively, and images depicting geographical areas which overlap at least partially.

In some embodiments, said machine learning classifier is trained on a training set comprising (i) a plurality of images depicting a dense recurring pattern, and (ii) labels associated with said at least two classes, and wherein said images are labelled with said labels.

In some embodiments, said set of classes comprises at least some of foliage, tree trunk, tree limb, grass, undergrowth, road, gravel path, alley, rocky formation, and stony formation.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 3A-3C schematically illustrate a process for optimizing transformation parameters, according to an embodiment;

DETAILED DESCRIPTION

Figure 1:
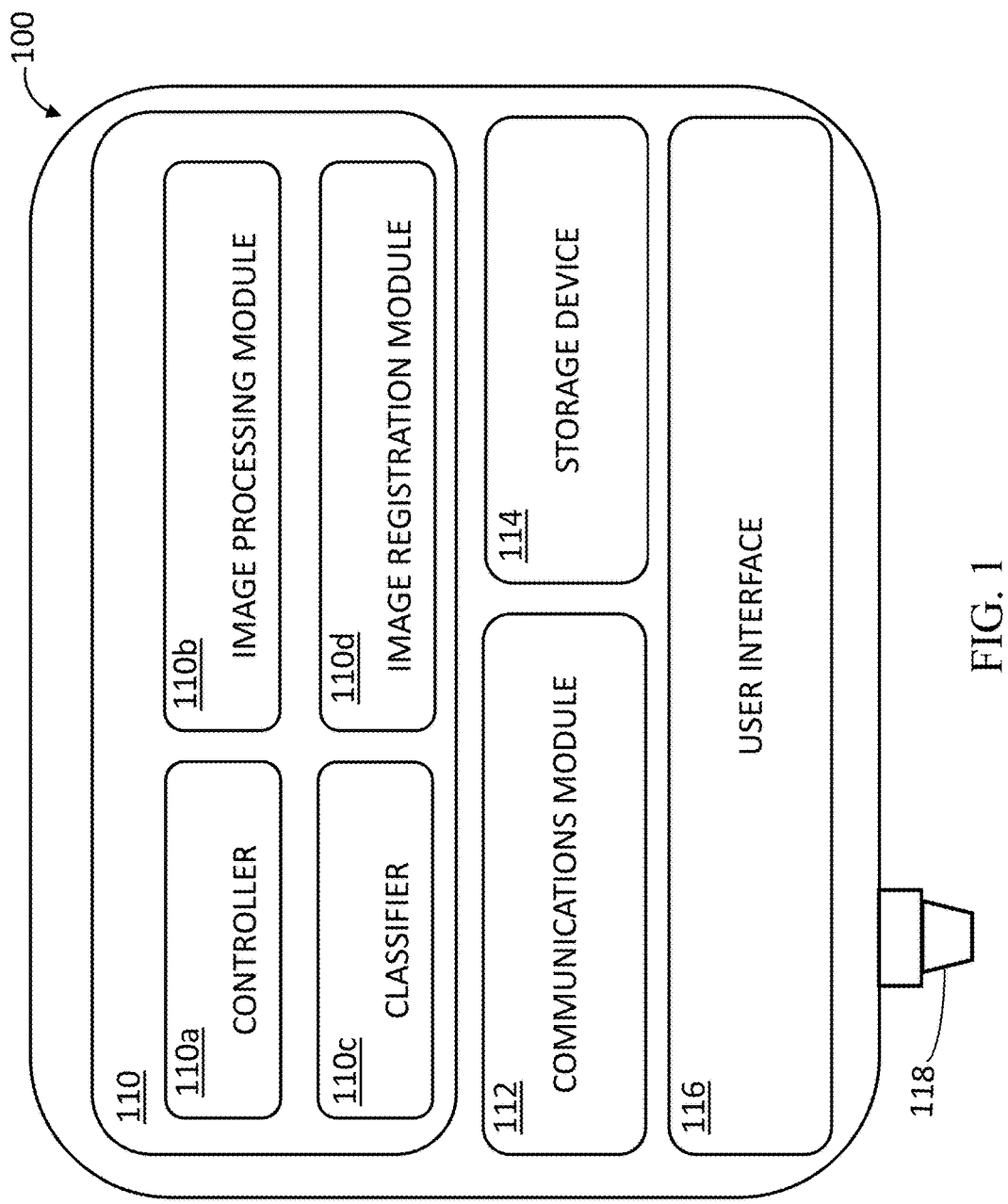
FIG. 1 shows a schematic illustration of an exemplary system of image registration, according to an embodiment.

Described herein are a system, method, and computer program product for automated machine-learning based registration of images, wherein the images may depict a dense recurrent pattern, e.g., including an array of the same and/or similar objects arranged in close proximity to one another.

In some embodiments, the images may be concurrent and/or consecutive images, e.g., taken periodically over time. In some embodiments, the images may cover areas which may wholly or partially overlap.

In some embodiments, the dense recurring pattern may comprise, for example, trees and/or other plants planted according to a specified planting scheme, e.g., in an orchard.

In some embodiments, an image registration algorithm according to the present disclosure may be configured to perform pixel-level classification in two or more images, wherein an image registration and/or alignment may be based, at least in part, on matching of pixel-based classes between the several images.

In some embodiments, the present algorithm may provide an improved registration process, for example, even if images to be aligned are captured at different times, from different poses and/or angles, via different image capturing sensors and/or systems, in different spectral bands, and/or under different lighting and visibility conditions.

In some embodiments, the present algorithm provides a method for identifying individual objects in images, wherein the objects comprise a relatively dense, compact, and/or converging array of similar objects. In some embodiments, the present algorithm provides for tracking and monitoring changes, over time, within a relatively dense, compact, and/or converging array of objects, based on said identifying.

In some embodiments, the present algorithm may be particularly suitable for a task of remotely monitoring growth of trees, shrubs, crops, and/or other plants from above earth's surface.

In some embodiments, the images may be aerial images, which may include imagery captured from a perspective above the ground. In one example, aerial imagery may include satellite imagery, airborne imagery, and/or imagery captured from a tower, a building, an Unmanned Aerial Vehicle (UAV), a helicopter, a plane, and/or from any other above-ground perspective.

In some embodiments, to monitor changes over time in a crop, orchard, and/or any natural objects, it may be required to segment and/or detect individual trees within woods, orchards, groves, and/or fields, a task which may present several difficulties. For example, feature-based methods of object detection and/or object-to-object association from aerial imagery are often based on detecting unique features for extracting roads, intersections, buildings and similar objects from imagery. However, in contrast with man-made objects and structure, natural objects, such as trees and other plants, typically do not have well-defined shapes and/or features which may be directly detected or use for object-to-object association.

The problem may be exacerbated by a typical layout of commercial orchards, which may include a dense recurring pattern of very similar objects, e.g., lacking strong identifiable features. These objects may be planted with minimal spacing between them. In addition, as trees grow, their canopies may come to be in close proximity and/or even in direct and/or overlapping contact with one another, thereby further obscuring any contracting background in the imagery, e.g., gravel or dirt alleys between rows, which may help segment individual trees.

In addition, within a context of monitoring plant growth, two or more consecutive images of a same orchard section acquired over time, may hold valuable complementary information regarding, for example, growth, development, health, and/or crop yield. Accordingly, a proper integration of data obtained from the several images is often desired. A first step in an integration process of the several images may include bringing modalities and/or objects involved into a spatial alignment, for example, by a registration process, e.g., which involves aligning a target image to a source image, e.g., regardless of visibility conditions, image capturing pose and/or angle, and/or image capturing sources.

In some embodiments, an accurate alignment of consecutive, concurrent, and/or partially overlapping images may enable the efficient monitoring of any change and/or variance that occurred to an orchard between capturing a source image of the orchard and capturing a consecutive target image of the orchard, for example, regarding growth, development, health, and/or crop yield.

In some embodiments, accurate registration and/or alignment of images may enable the piecing together of smaller and/or partial images covering section s and/or portions of a larger area, into a larger contiguous image.

In some embodiments, references to 'recurring' and/or 'repeated' patterns or arrays of objects may refer to planting schemes and layouts of typical commercial plant orchards, which may comprise, e.g., square, rectangular, quincunx, triangular, hexagonal, or similar planting schemes.

In some embodiments, references to 'dense' patterns may refer to minimal and/or reduced spacing between individual plants and/or rows of plants within the context of an orchard.

Reference is now made to FIG. 1, which is a schematic illustration of an exemplary system 100, according to the present invention. The various components of system 100 may be implemented in hardware, software or a combination of both hardware and software. system 100 as described herein is only an exemplary embodiment of the present invention, and in practice may have more or fewer components than shown, may combine two or more of the components, or a may have a different configuration or arrangement of the components.

In some embodiments, system 100 may include a hardware processor 110, a controller 110a, an image processing module 110b, a classifier 110c, an image registration module 110d, a communications module 112, a memory storage device 114, a user interface 116, an imaging sensor 118. System 100 may store in a non-volatile memory thereof, such as storage device 114, software instructions or components configured to operate a processing unit (also "hardware processor," "CPU," or simply "processor), such as hardware processor 110. In some embodiments, the software components may include an operating system, including various software components and/or drivers for controlling and managing general system tasks (e.g., memory management, storage device control, power management, etc.) and facilitating communication between various hardware and software components.

In some embodiments, imaging sensor 118 may include one or more sensors, for example, which may input one or more data streams and/or multiple frames to enable identification of at least one object. In other embodiments, imaging sensor 118 may include an interface to an external imaging device, e.g., which may input one or more data streams and/or multiple frames to system 100 via imaging sensor 118.

In some embodiments, non-transient computer-readable storage device 114 (which may include one or more computer readable storage mediums) may be used for storing, retrieving, comparing, and/or annotating captured frames. Image frames may be stored on storage device 114 based on one or more attributes, or tags, such as a time stamp, a user-entered label, or the result of an applied image processing method indicating the association of the frames, to name a few.

The software instructions and/or components operating hardware processor 110 may include instructions for receiving and analyzing multiple frames captured by imaging sensor 118. For example, image processing module 110b may receive one or more image frames and/or image streams from imaging sensor 118 or from any other interior and/or external device, and apply one or more image processing algorithms thereto.

In some embodiments, controller 110a may be configured to perform and/or to trigger, cause, control and/or instruct system 100 to perform one or more functionalities, operations, procedures, and/or communications, to generate and/or communicate one or more messages and/or transmissions, and/or to control hardware processor 110, image processing module 110b, classifier 110c, image registration module 110d, communications module 112, memory storage device 114, user interface 116, imaging sensor 118, and/or any other component of system 100.

In some embodiments, image processing module 110b may include one or more algorithms configured to perform such image processing tasks with respect to images captured by imaging sensor 118 or by any other interior and/or external device, using any suitable image processing or feature extraction technique. The images received by the image processing module 110b may vary in resolution, frame rate, format, and protocol. The processing module 110b may apply processing algorithms to the images, e.g., alone or in combination.

In some embodiments, classifier 110c is a machine learning classifier which may be configured to be trained on a training set comprising a plurality of images and labels, and to classify each pixel in an image according into specified classes according to one or more classification techniques and/or algorithms.

In some embodiments, image registration module 110d may be configured to perform image registration and/or alignment based, at least on part, on the result of the classification by classifier 110c. For example, image registration module 110d may be configured to apply a transformation to a reference image according to the present algorithm one or more registration techniques and/or algorithms.

In some embodiments, communications module 112 may connect system 100 to a network, such as the Internet, a local area network, a wide area network and/or a wireless network. Communications module 112 facilitates communications with other external information sources and/or devices, e.g., external imaging devices, over one or more external ports, and also includes various software components for handling data received by system 100.

In some embodiments, user interface 116 may include circuitry and/or logic configured to interface between system 100 and a user of system 100. user interface 116 may be implemented by any wired and/or wireless link, e.g., using any suitable, Physical Layer (PHY) components and/or protocols.

In some embodiments, system 100 may further comprise a GPS module which may include a Global Navigation Satellite System, e.g., which may include a GPS, a Global Navigation Satellite System (GLONASS), a Galileo satellite navigation system, and/or any other satellite navigation system configured to determine positioning information based on satellite signals. In some embodiments, GPS module may include an interface to receive positioning information from a control unit and/or from any other external system.

In other embodiments, system 100 may exclude a GPS module, communications module 112, user interface 116, imaging sensor 118, image registration module 110d, and/or any other component and/or sensor.

In some embodiments, system 100 may be configured to implement an alignment and/or a registration scheme, e.g., configured to enable accurate image classification and/or transformation of aerial imagery, e.g., as described below.

In some embodiments, controller 110a may be configured to cause image processing module 110b to receive a source image and/or a target image, for example, each depicting a dense recurring pattern including an array of objects arranged in close proximity to one another, e.g., as described below.

In some embodiments, controller 110a may be configured to cause classifier 110c to obtain a classification, e.g., a pixel-level classification, of the source image and/or the target image into one of at least two classes.

In some embodiments, controller 110a may be configured to cause image registration module 110d to determine a transformation between the source and target images, based, at least in part, on a set of transformation parameters.

In some embodiments, controller 110a may be configured to cause image registration module 110d to train a neural network to optimize the set of transformation parameters, e.g., by minimizing a loss associated with the transformation. In some embodiments, the loss is based, at least in part, on a rate of matching of the pixel-level classification between the source and the target image. In some embodiments, the loss is expressed in terms of a weighted sum of per-pixel matches between the source and target images.

In some embodiments, controller 110a may be further configured to apply the optimized set of transformation parameters to the target image, to generate an accurate transformation between the source image and the target image.

In some embodiments, at least one object of the present invention may be, for example, to minimize an association of pixels to a wrong class, e.g., and/or to enable a maximal rate of pixel matches between target and source images.

Figure 2:
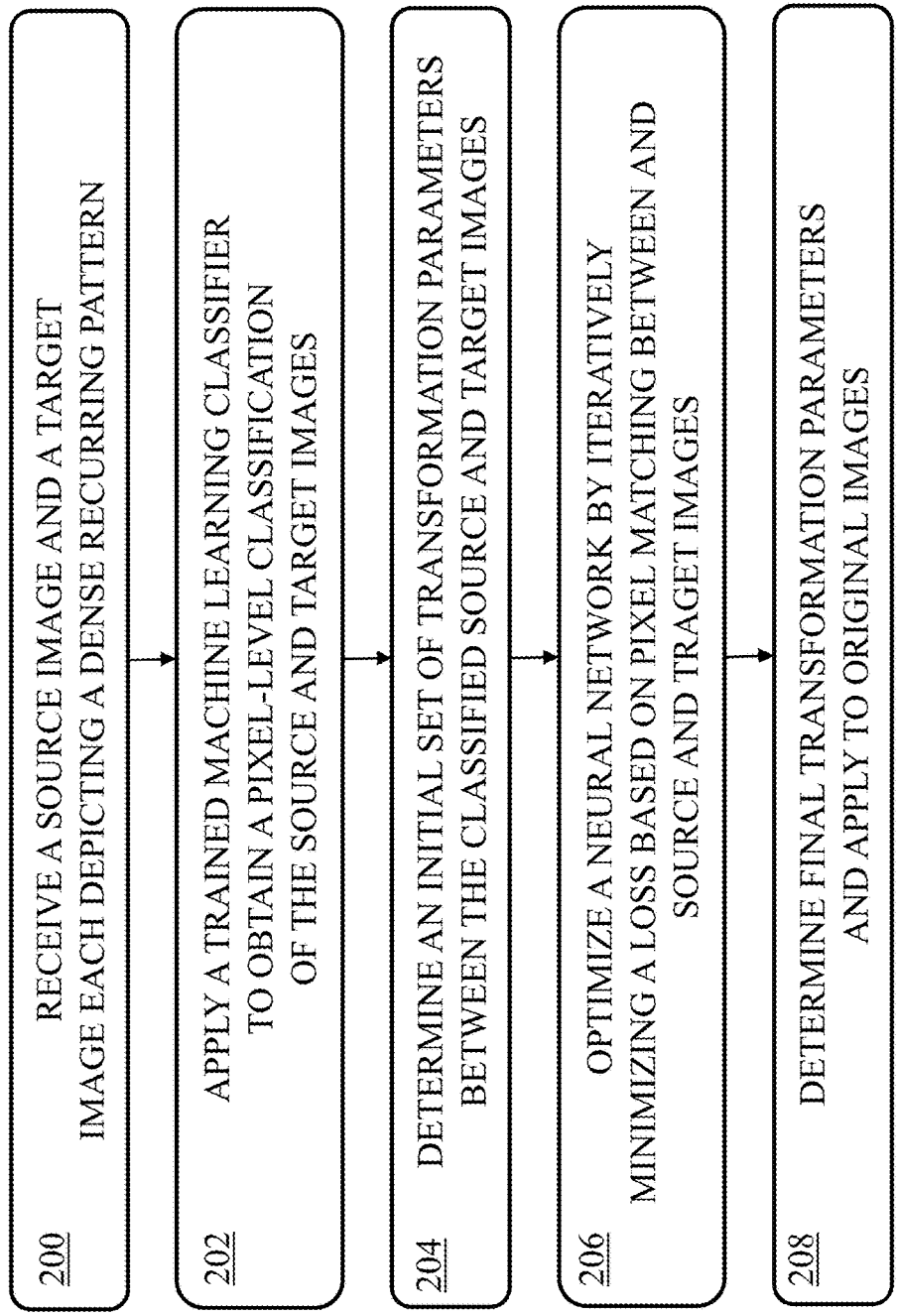
FIG. 2 is a flowchart illustrating the functional steps in an automated machine-learning based registration of images, according to an embodiment.

FIG. 2 illustrates the functional steps in a process for automated registration of images, wherein the images may depict a dense recurrent pattern.

In some embodiments, image registration according to the present algorithm may be performed in two stages. During a first stage, e.g., a classification stage, a pixel-level classifier may be trained to classify each pixel in an image into a variety of classes (e.g., tree, canopy, trunk, limb, path, road, etc.) to each pixel in the consecutive images. During a second stage, e.g., a transformation stage, the present algorithm may determine a highly accurate transformation between the images, (e.g., source and target images), based, at least in part, on matching pixel classes.

At a step 200, the present algorithm may receive as input, e.g., a source and target images depicting a dense recurring pattern, as described above.

At a step 202, the present algorithm may apply a trained machine learning classifier to perform pixel-level classification of the target and source images, to produce multi-class target and source images, e.g., by assigning a class from a plurality of classes to each pixel of the target and source images. Pixel-level multi-class classified target and source images may be generated, for example, to classify each pixel of the at least target and/or source images to a class of a set of classes.

In some embodiments, to enable accurate classification of aerial imagery, a pixel-level machine learning classifier, e.g., classifier 110c, may be trained to associate and/or classify pixels in an image depicting dense, recurring patterns, based, at least in part, on a training set comprising suitable images.

In some embodiments, the training set may comprise a plurality of images depicting a dense recurrent pattern, e.g., images of forestry, orchards, groves, crop fields, etc. In some embodiments, the images in the training set may be segmented to define objects and/or other regions of interest (ROI) in each image. In some embodiments, the segmented images in the training set may be labelled according to a plurality of classes corresponding to the objects and/or ROIs identified in each images. In some embodiments, the segmenting and/or labelling may be performed manually. In some embodiments, the training set may comprise segmented and/or labelled images from one or more existing databases, databanks, catalogs, and/or similar sources.

In some embodiments, the plurality of classes may include a classification, e.g., a binary classification into two classes, e.g., a tree and a non-tree. In another example, the set of classes may include a multi-class classification relating to multiple objects, e.g., a tree, foliage, a tree trunk, a tree limb, grass, undergrowth, a road, a gravel path and/or alley, a rocky and/or stony area, and/or any other object.

In some embodiments, at a training stage, classifier 110c may be trained on the training set described above. In some embodiments, classifier 110c may comprise two or more classifiers, wherein each of the classifiers may be trained on a different training set comprising, e.g. images taken with different imaging devices, in different spectral bands, and/or under different lighting and visibility conditions.

In some embodiments, the pixel-level classifier may be configured to classify the target and/or source images to produce a classification of each pixel into one of a set of classes. In some embodiments, the classifier may be further configured to assign a confidence score to each classification, e.g., according to a probability that the pixel belongs the assigned class.

In some embodiments, the pixel-level classifier may be configured to receive as input images and output pixel-level classified images.

In some embodiments, a pixel-level classifier may correspond to a specific sensor and/or image. In one example, a specific pixel-level classifier may be used for corresponding cameras and/or image capturing modules.

In one example, a first neural network may be trained on a labeled training set corresponding to a first camera type, and a second neural network may be trained on a labeled training set corresponding to a second camera type. Both neural networks may be configured to produce an optimal pixel-level classification based on each training set and corresponding labels.

In other embodiments, a pixel-level classifier may be trained on a single training set corresponding to a plurality of cameras and/or image capturing modules.

With continued reference to FIG. 2, at a step 204, in some embodiments, after classifying pixels between target and source images in the classification stage of the present invention, the transformation stage may provide an accurate alignment of aerial imagery, for example, by determining an accurate transformation between target and source images, when the target and source images depict a dense recurring pattern.

In some embodiments, a transformation may be defined as a set of movements applied to an image set. For example, a transformation may include a deformable, affine, rigid and/or perspective transformation to the image set. In other embodiments, a transformation may include any other scheme and/or set of movements to be applied to an image set.

In one example, the transformation stage may include utilizing a source image as a reference, while a transformation may be applied to one or more target images in order to align common subject matter, e.g., any common subject matter, between both image sets, for example, so that the subsequent image sets may match the reference image set.

In some embodiments, the transformation stage may be configured to receive as an input a source image, e.g., to be used as a reference image, a target image, e.g., which may be a non-aligned image, wherein each of the pixels in the source and the target images is classified into a class of a set of classes.

In some embodiments, the transformation stage may be configured to utilize an optimization technique to find a transformation minimizing an amount of non-matching pixels between a pixel-level classified target image and a pixel-level classified source image.

In some embodiments, an optimization problem may be described as follows:

given a source image S, having a size n×m, with each pixel having a class value c from classes 1 ... C, and given a target image T having a size n×m, with each pixel having a class value c from classes 1 ... C, use an algorithm to minimize a loss, e.g., as follows:

$$\Sigma W_{ij} * f(s_{ij}, r_{ij}) \qquad (1)$$

wherein for any pixel classes x and y, f(x,y) may denote a cost function of matching pixel class x with pixel class y.

In some embodiments, the transformation stage may be configured to determine an optimal transformation between pixel-level classified target and source images, for example, according to at least one optimization technique and/or algorithm, for example, according to a gradient descend technique and/or algorithm, e.g., which may be used to find accurate transformation parameters for a minimal loss between pixels of pixel-level classified target and source images.

In some embodiments, gradient descent methods may enable finding a gradient descent solution for accurate object alignment, for example, without having to resort to an impractical exhaustive search, a high computation scheme and/or any inefficient and/or inaccurate scheme. Additionally, gradient descent methods may provide a desirable property of treating all objects in a unified way.

In some embodiments, the transformation stage of the present invention may be implemented, e.g., as described below.

With continued reference to step 204 in FIG. 2, in some embodiments, the transformation stage may apply an initial transformation to derive a set of initial transformation parameters. In some embodiments, the initial transformation may be, e.g., an affine transformation, for example, to provide a preliminary and/or rough, e.g., sub-optimal, alignment between the pixel-level classified target and source images. In some embodiments, the initial transformation may be performed according to one to more transformation algorithms, such as, e.g., an ORB algorithm.

In some embodiments, the transformation stage may score the rough alignment, e.g., by applying an intersection-over-union model and/or any other similar method. In some embodiments, the score may represent an error in the transformation between a source and target images. In some embodiments, a score may be calculated with respect to every object in an image independently, thus providing a separate score to a surrounding of every object. For example, a per-object error may be measured around each object, e.g., independently, for example, instead of computing a general feature-based error for all objects in an image at once.

At a following step 206, the present algorithm may be configured to train a neural network to optimize the initial set of transformation parameters, based, at least in part, on minimizing a loss function which calculates a weighted sum of per-pixel matches between the source and target images.

Figure 3A:
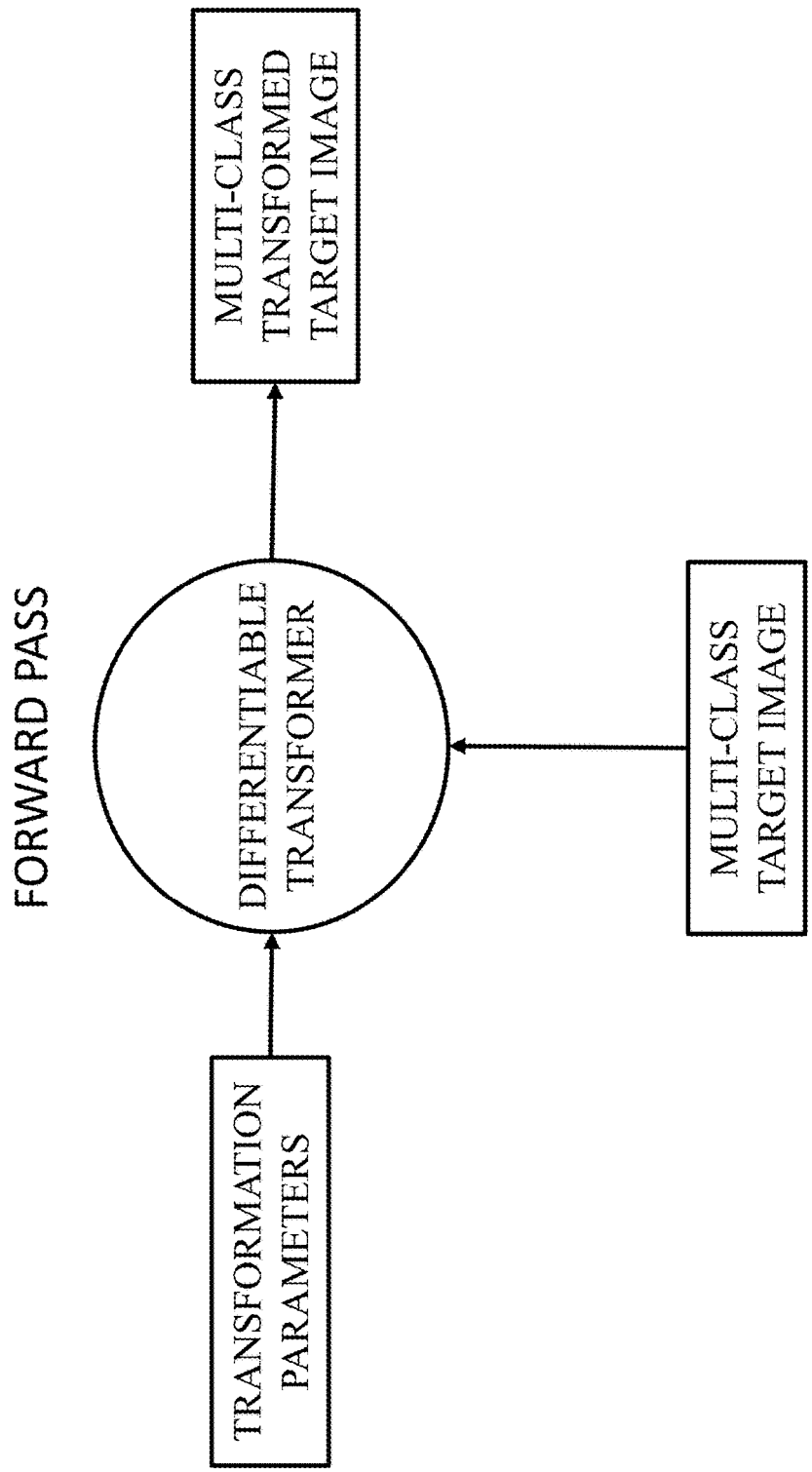
Figure 3C:
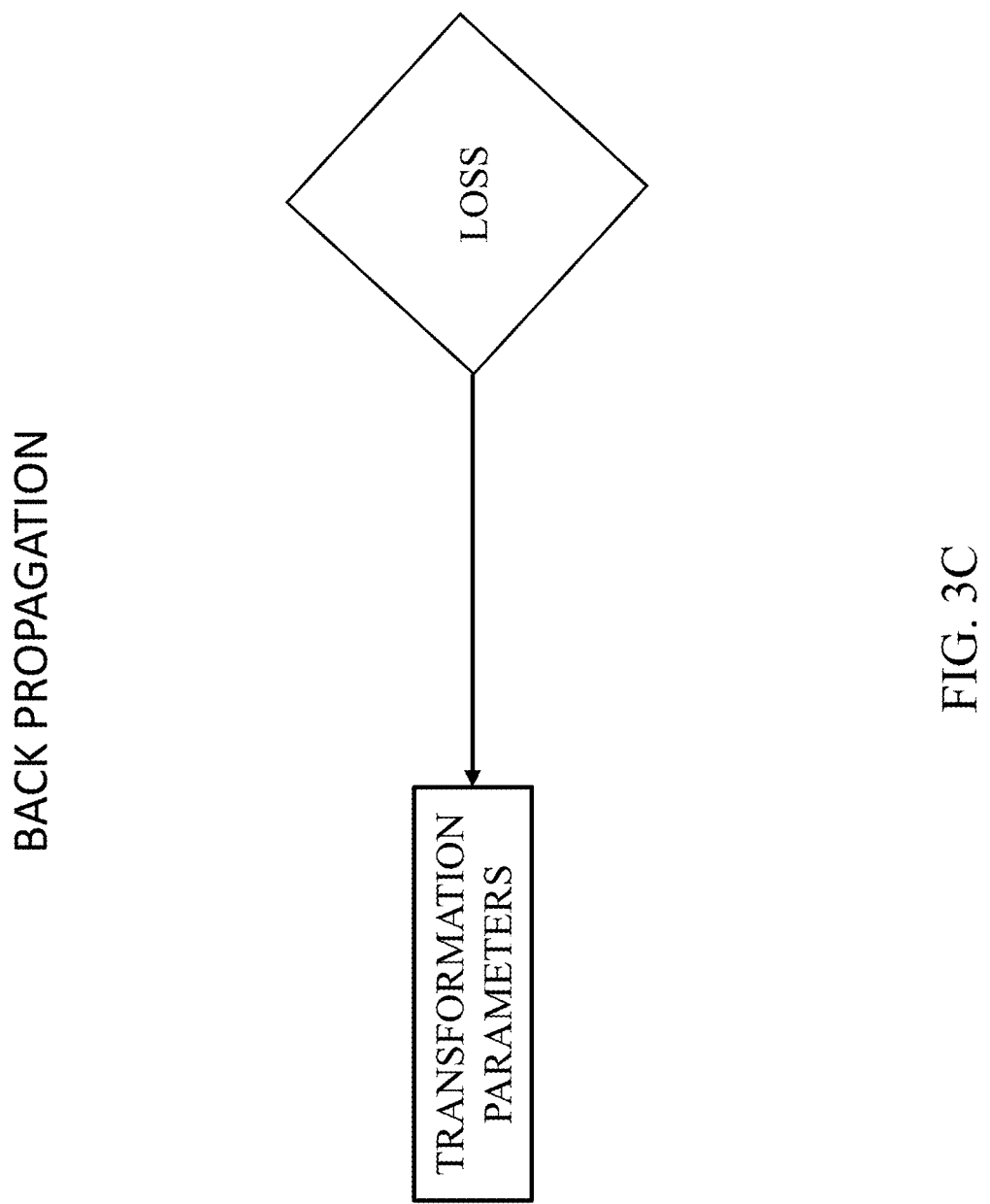

FIGS. 3A-3C schematically illustrate an iterative process for optimizing transformation parameters, according to the present embodiment.

With reference to FIG. 3A, in some embodiments, the optimization process may comprise a forward pass stage, wherein the present algorithm applies a differentiable transformer to the source image and initial set of transformation parameters to generate a transformed target image.

In some embodiments, the transformation stage may utilize a differentiable function. The differentiable transformer may be configured to transform pixel-level classified images, e.g., by using a transformation matrix and/or differentiable image sampling code.

In some embodiments, the differentiable transformation parameters may be defined, e.g., as a transformation $A_\theta$: $\mathbb{R}^2 \to \mathbb{R}^2$ may be a mapping represented by n parameters. Let $\theta_1$ through $\theta_n$ be a set of parameters that, when applied to a point in $\mathbb{R}^2$, may provide a result point in $\mathbb{R}^2$. An example of $A_\theta$ could be, for example, an affine transformation represented as a matrix of 6 parameters, by way of matrix multiplication:

$$\begin{pmatrix} x_i^s \\ y_i^s \end{pmatrix} = T_\theta(G_i) = A_\theta \begin{pmatrix} x_i^t \\ y_i^t \\ 1 \end{pmatrix} = \begin{bmatrix} \theta_{11} & \theta_{12} & \theta_{13} \\ \theta_{21} & \theta_{22} & \theta_{23} \end{bmatrix} \begin{pmatrix} x_i^t \\ y_i^t \\ 1 \end{pmatrix}$$

wherein $G_i$ may denote a point i in a grid of points G, $x_i^t$, and $y_i^t$ may denote points of a target image in Gi, $x_i^s$ and $y_i^s$ may denote points of a corresponding source image, and $\theta_{11}$ through $\theta_{23}$ may denote differentiable transformation parameters.

In some embodiments, it may be advantageous that transformation parameters of a transformation may represent a differentiable function which may be optimized using, e.g., a function such as a gradient descent function, e.g., by determining an accurate loss and/or a backpropagation gradient.

In some embodiments, a grid generator may then generate a set of points where the source image may be sampled. In some embodiments, the grid may then be applied to the source image, to sample a set of sampling points $T_\theta(G)$ in the source image, based on a source image map S. Accordingly, each coordinate $(x_i, y_i)$ in $T_\theta(G)$ may define a spatial location in the source image, where a sampling kernel may be applied to get a value at a particular pixel. The sampled value may then be transformed using the transformation matrix into a location and value in the target image.

With reference to FIG. 3B, in some embodiments, the optimization process may then calculate a loss between the transformed target image and the source image, based, at least in part, on a pixel-based loss between the transformed image and the source image.

With reference to FIG. 3C, in some embodiments, the optimization process may then apply back-propagation to update the transformation parameters by means of, e.g., maximal gradient toward minimizing the loss. In some embodiments, the loss may be calculated as a weighted sum of per-pixel matches of multi-class probabilities between the source and target images. In some embodiments, the process of step 206 with reference to FIGS. 3A-3C may be repeated iteratively, until the loss function reaches convergence.

In some embodiments, once the loss unction has reached convergence which optimizes the transformation parameters, these optimized transformation parameters may be applied to the original target image, to align the original raster (e.g., before pixel-based classification) with the target raster. In some embodiments, a target image may be transformed, e.g., using a final configuration of the transformation parameters, for example, which may result in an optimal alignment of the target image to a source image.

In some embodiments, the algorithm is further configured to estimate a registration error for each object of the dense, recurrent array of objects in the aligned images.

In some embodiments, an accurate transformation may be based, at least in part, on an accurate association of classes to pixels of the target and source images, e.g., at the classification stage.

In some embodiments, an ability to associate a transformation from one image, e.g., a target image, to another image, e.g., a source image, may be crucial for a variety of applications, e.g., including geospatial alignment of satellite images, alignment of aerial images, three-dimensional (3D) reconstruction and/or any other image processing application.

Figure 4A:
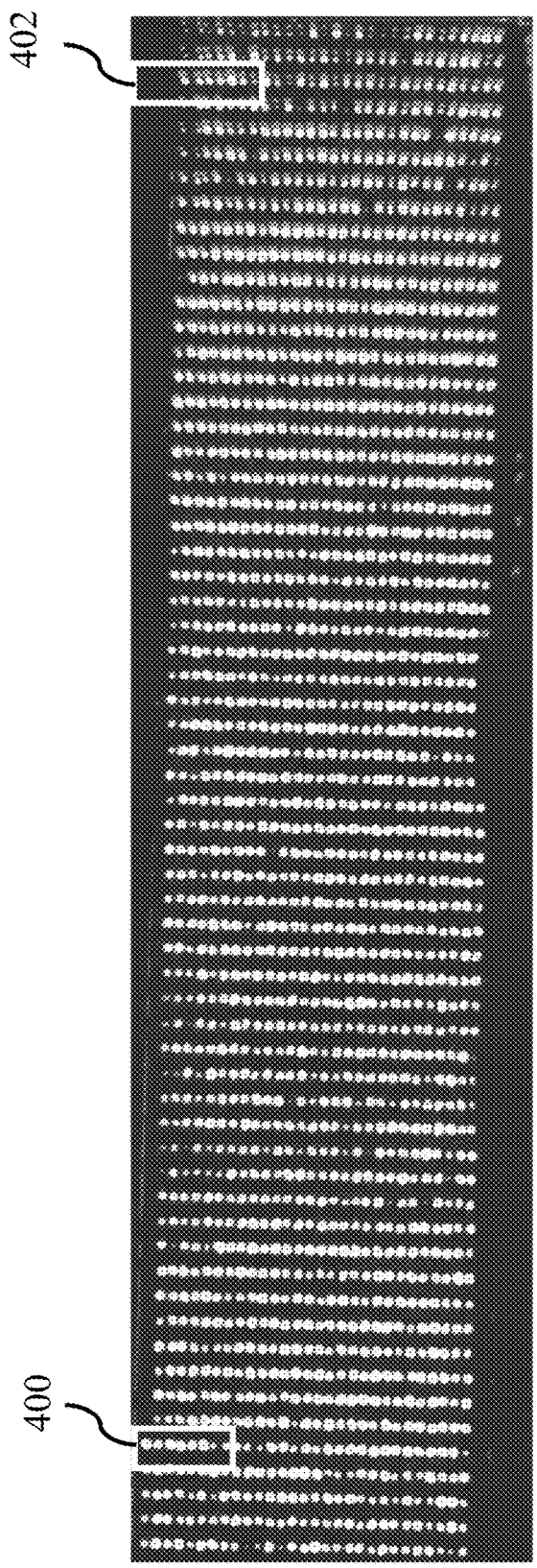
FIGS. 4A-4C illustrate registration results using known methods.
Figure 4B:
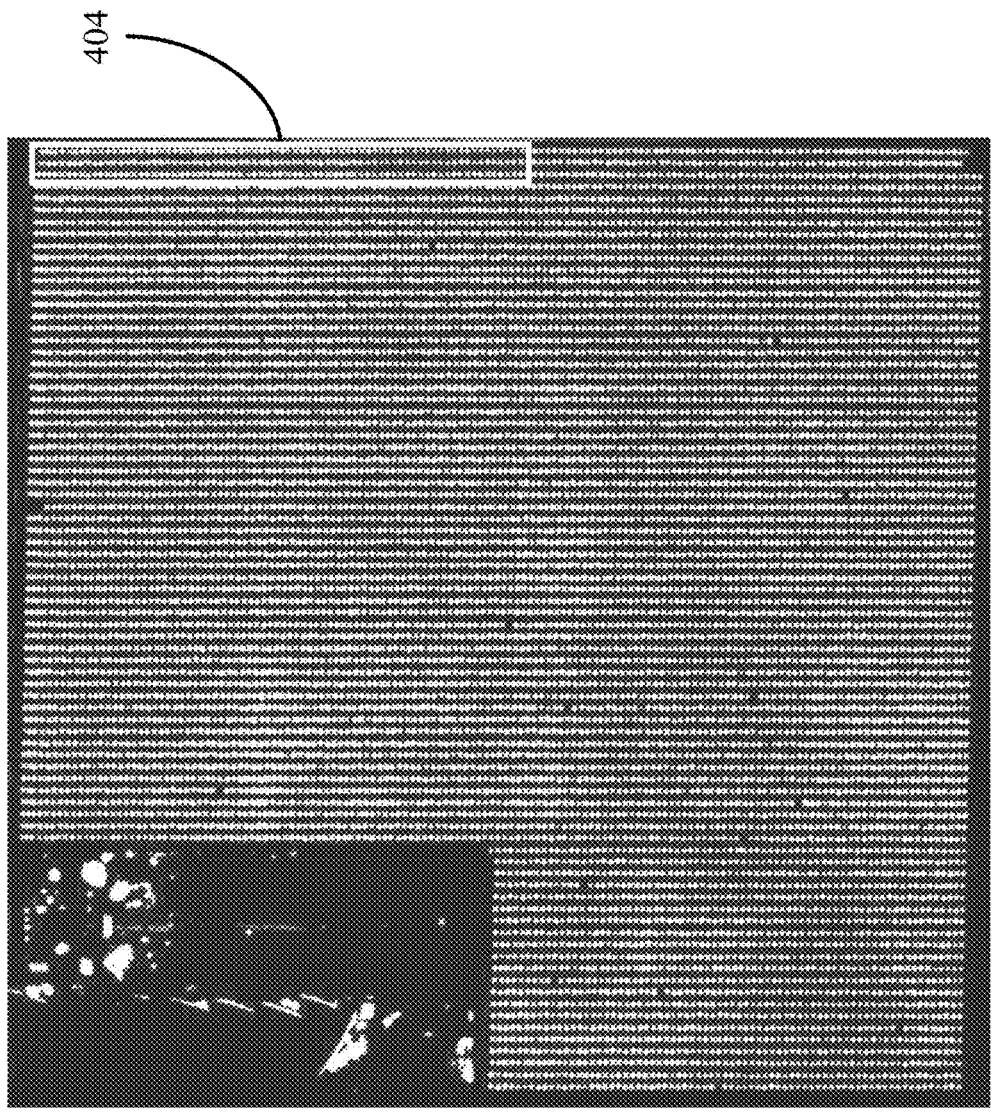
Figure 4C:
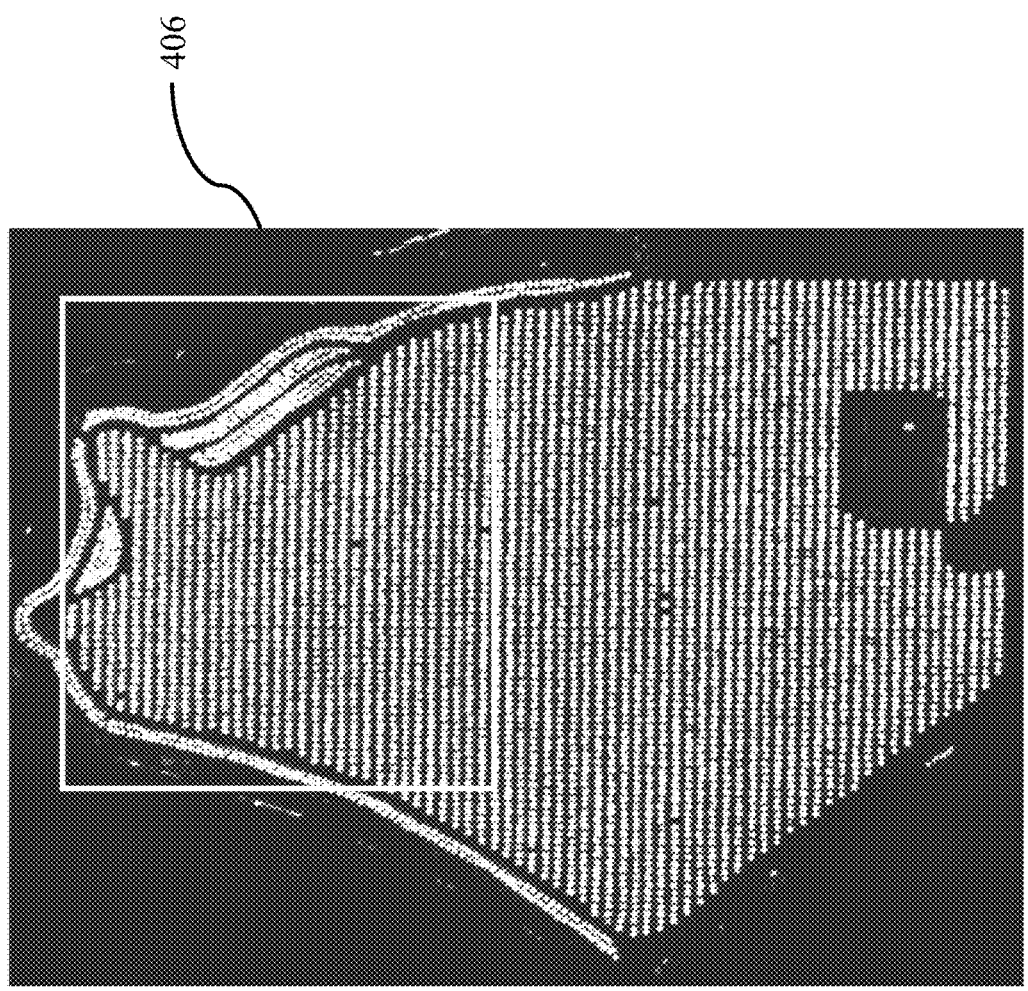

FIGS. 4A-4C illustrate registration results of a series of source and target images, according to known registration methods. As can be seen, some of the pixels in the source and target images align, however, some do not. For example, rectangle 400 in FIG. 4A illustrates a column of pixels in a specified class (e.g., a 'tree' class) which overlap. However, rectangles 402 in FIG. 4A, 404 in FIG. 4B, and 406 in FIG. 4C illustrate pixels which do not align between source and target images.

Figure 5A:
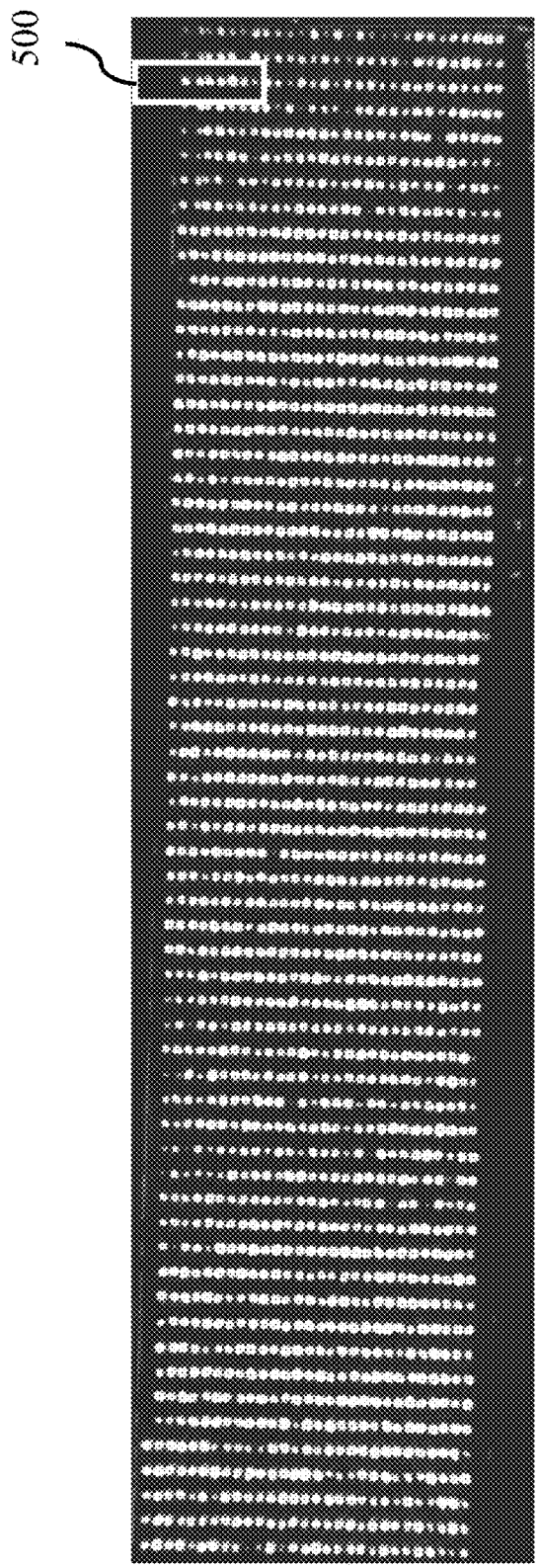
FIGS. 5A-5C illustrate exemplary experimental results of an automated machine-learning based registration of images, according to an embodiment.
Figure 5B:
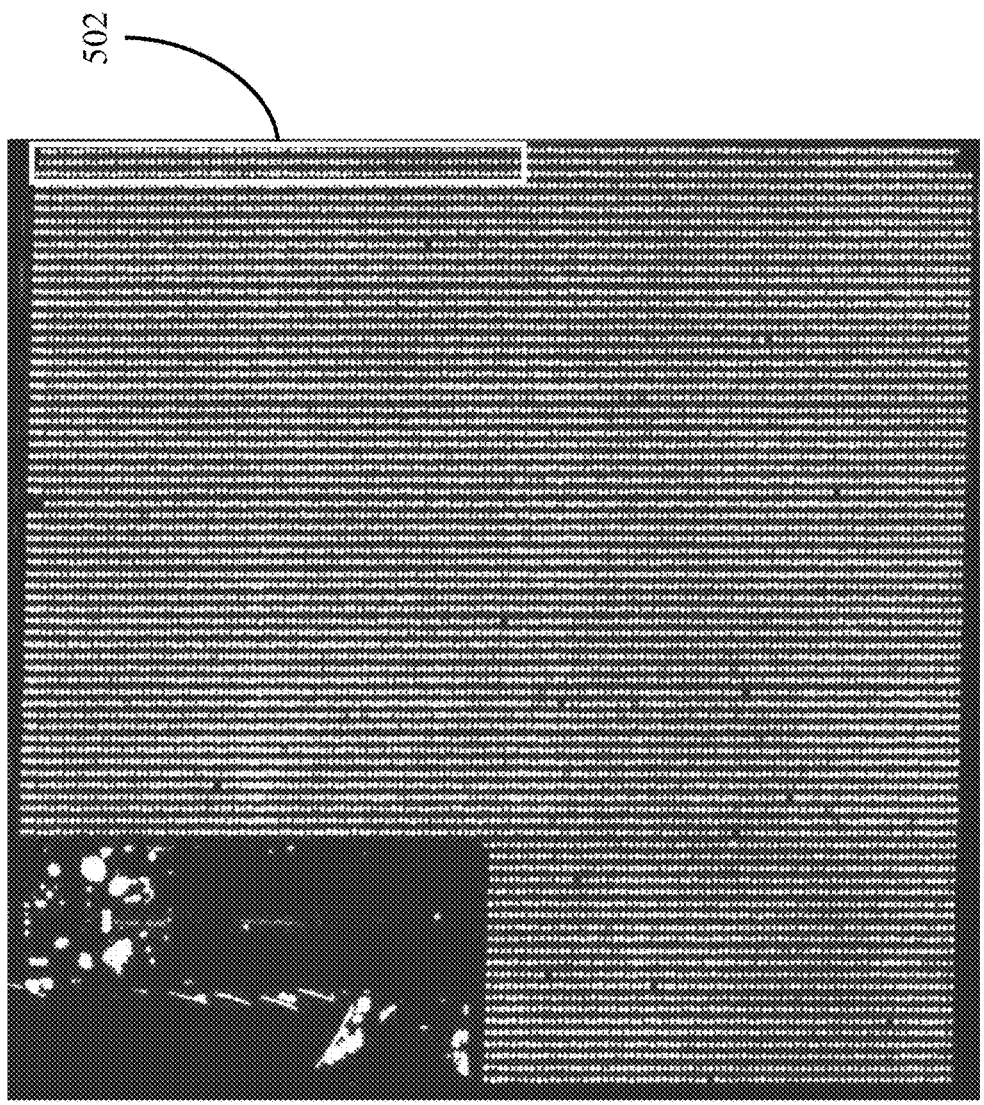
Figure 5C:
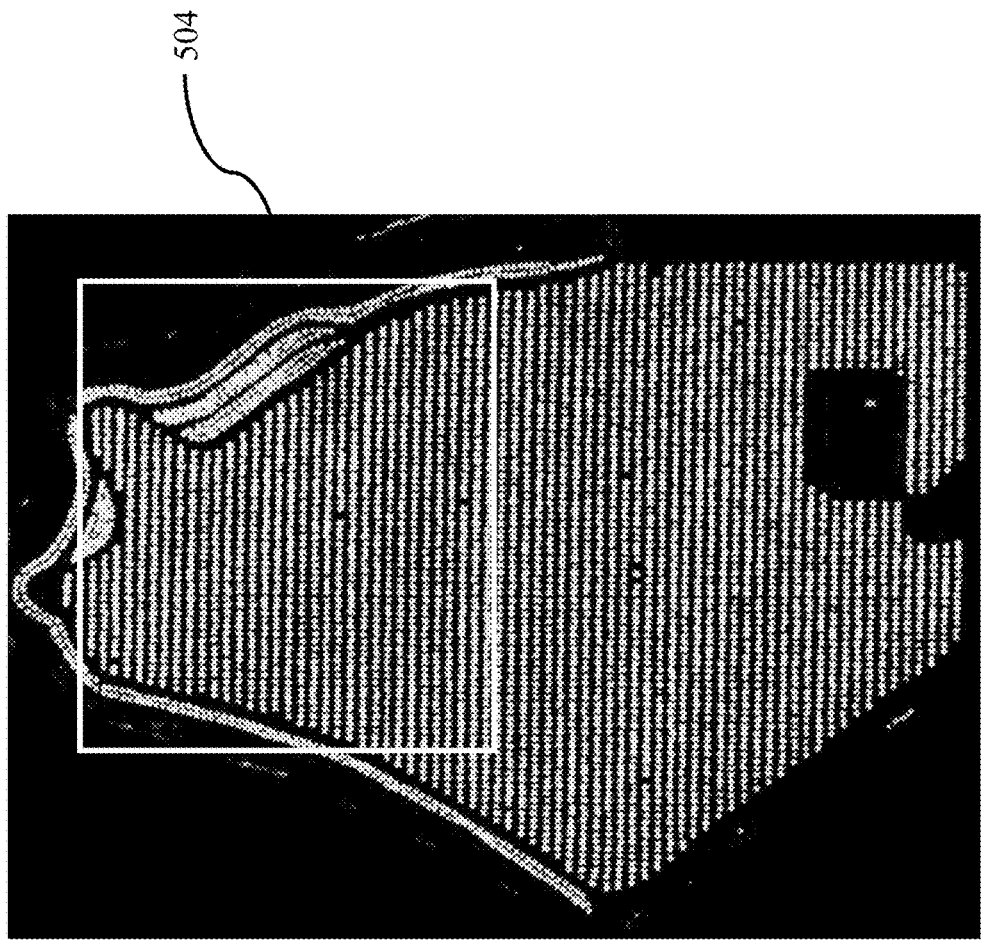

FIGS. 5A-5C illustrate exemplary experimental registration results of the same series of source and target images shown in FIGS. 4A-4C, using the present algorithm. As can be seen, rectangles 500 in FIG. 5A, 502 in FIG. 5B, and 504 in FIG. 5C show an optimized pixel alignment in the areas were previous methods produced misaligned pixels (as shown in 402 in FIG. 4A, 404 in FIG. 4B, and 406 in FIG. 4C).

Figure 6A:
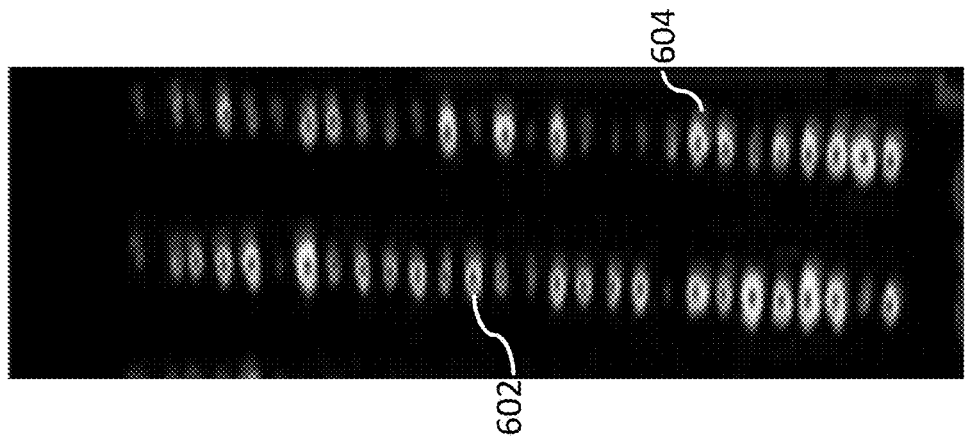
FIGS. 6A-6B are closeup illustrations of exemplary experimental results, according to an embodiment.
Figure 6B:
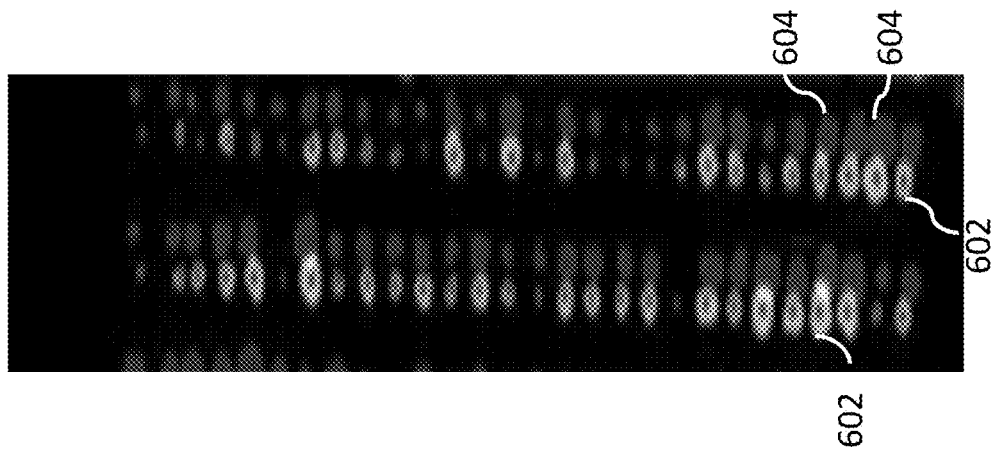

FIG. 6A is a closeup illustration of pixels aligned according to known methods, e.g., an ORB algorithm. As can be seen, e.g., pixels 602 are not aligned with pixels 604, which are classified in the same classification. FIG. 6B is a closeup illustration of pixels aligned according to the present algorithm. As can be seen, pixels 502 are more closely aligned.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of modified purpose computer, special purpose computer, a general computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a source image and a target image, each depicting a dense recurring pattern comprising an array of objects arranged in close proximity to one another;
applying a trained machine learning classifier to obtain a classification of each pixel in said source image and said target image into one of at least two classes;
determining a pixel-level transformation between said classified source and target images, based, at least in part, on a set of transformation parameters;
training a neural network to optimize said set of transformation parameters, based, at least in part, on minimizing a loss function which calculates a weighted sum of per-pixel matches between said classified source and target images; and
applying said optimized set of transformation parameters to said target image to align said target image with said source image.

2. The method of claim 1, wherein said minimizing is based, at least in part, on a gradient descent algorithm.

3. The method of claim 1, wherein at least some of said objects are in contact engagement with one another.

4. The method of claim 1, wherein said objects are selected from the group consisting of trees, plants, shrubs, and crops, and wherein said array comprises a planting layout of said objects in one of an orchard, a grove, a field, and a wood.

5. The method of claim 1, wherein said source and target images are selected from the group consisting of: images taken concurrently, images taken consecutively, and images depicting geographical areas which overlap at least partially.

6. The method of claim 1, wherein said machine learning classifier is trained on a training set comprising (i) a plurality of images depicting a dense recurring pattern, and (ii) labels associated with said at least two classes, and wherein said images are labelled with said labels.

7. The method of claim 1, wherein said set of classes comprises at least some of foliage, tree trunk, tree limb, grass, undergrowth, road, gravel path, alley, rocky formation, and stony formation.

8. A system comprising:
at least one hardware processor; and
a non-transitory computer-readable storage medium having stored thereon program instructions, the program instructions executable by the at least one hardware processor to:
receive a source image and a target image, each depicting a dense recurring pattern comprising an array of objects arranged in close proximity to one another,
apply a trained machine learning classifier to obtain a classification of each pixel in said source image and said target image into one of at least two classes,
determine a pixel-level transformation between said classified source and target images, based, at least in part, on a set of transformation parameters,
train a neural network to optimize said set of transformation parameters, based, at least in part, on minimizing a loss function which calculates a weighted sum of per-pixel matches between said classified source and target images, and
apply said optimized set of transformation parameters to said target image to align said target image with said source image.

9. The system of claim 8, wherein said minimizing is based, at least in part, on a gradient descent algorithm.

10. The system of claim 8, wherein at least some of said objects are in contact engagement with one another.

11. The system of claim 8, wherein said objects are selected from the group consisting of trees, plants, shrubs, and crops, and wherein said array comprises a planting layout of said objects in one of an orchard, a grove, a field, and a wood.

12. The system of claim 8, wherein said source and target images are selected from the group consisting of: images taken concurrently, images taken consecutively, and images depicting geographical areas which overlap at least partially.

13. The system of claim 8, wherein said machine learning classifier is trained on a training set comprising (i) a plurality of images depicting a dense recurring pattern, and (ii) labels associated with said at least two classes, and wherein said images are labelled with said labels.

14. The system of claim 8, wherein said set of classes comprises at least some of foliage, tree trunk, tree limb, grass, undergrowth, road, gravel path, alley, rocky formation, and stony formation.

15. A computer program product comprising a non-transitory computer-readable storage medium having program instructions embodied therewith, the program instructions executable by at least one hardware processor to:
receive a source image and a target image, each depicting a dense recurring pattern comprising an array of objects arranged in close proximity to one another;
apply a trained machine learning classifier to obtain a classification of each pixel in said source image and said target image into one of at least two classes;
determine a pixel-level transformation between said classified source and target images, based, at least in part, on a set of transformation parameters;
train a neural network to optimize said set of transformation parameters, based, at least in part, on minimizing a loss function which calculates a weighted sum of per-pixel matches between said classified source and target images; and
apply said optimized set of transformation parameters to said target image to align said target image with said source image.

16. The computer program product of claim 15, wherein said minimizing is based, at least in part, on a gradient descent algorithm.

17. The computer program product of claim 15, wherein at least some of said objects are in contact engagement with one another.

18. The computer program product of claim 15, wherein said objects are selected from the group consisting of trees, plants, shrubs, and crops, and wherein said array comprises a planting layout of said objects in one of an orchard, a grove, a field, and a wood.

19. The computer program product of claim 15, wherein said source and target images are selected from the group consisting of: images taken concurrently, images taken consecutively, and images depicting geographical areas which overlap at least partially.

20. The computer program product of claim 15, wherein said machine learning classifier is trained on a training set comprising (i) a plurality of images depicting a dense recurring pattern, and (ii) labels associated with said at least two classes, and wherein said images are labelled with said labels.

\* \* \* \* \*